(12) United States Patent
Ferguson

(10) Patent No.: US 6,409,240 B1
(45) Date of Patent: Jun. 25, 2002

(54) WINCH HOOK HOLDER

(76) Inventor: Don Ferguson, 4462 Huron, Dearborn Heights, MI (US) 48125

( * ) Notice: Subject to any disclaimer, the term of this patent is extended or adjusted under 35 U.S.C. 154(b) by 0 days.

(21) Appl. No.: 09/664,206

(22) Filed: Sep. 18, 2000

(51) Int. Cl.$^7$ .............................. B25J 1/00; B63B 21/54
(52) U.S. Cl. .................................. 294/19.1; 114/221 R
(58) Field of Search ........................... 294/19.1, 22, 24, 294/82.1, 82.27, 103.1, 26; 114/221 R, 230.25

(56) References Cited

U.S. PATENT DOCUMENTS

| | | | | |
|---|---|---|---|---|
| 2,979,013 A | * | 4/1961 | Whittall | 294/19.1 |
| 3,098,462 A | * | 7/1963 | Holzman | 294/19.1 |
| 3,273,928 A | * | 9/1966 | Wisniewski | 294/19.1 X |
| 3,733,097 A | * | 5/1973 | Hank | 294/19.1 |
| 3,913,515 A | * | 10/1975 | Hernsjo et al. | 294/19.1 |
| 4,595,223 A | * | 6/1986 | Hawie | 294/19.1 |
| 4,986,207 A | * | 1/1991 | Reed | 294/19.1 X |
| 5,190,330 A | * | 3/1993 | Dunham | 294/19.1 |
| 5,215,344 A | | 6/1993 | Augustyniak | 294/19.1 |
| 5,967,575 A | * | 10/1999 | Blake | 294/19.1 |
| 6,193,432 B1 | | 2/2001 | Kampfert | 403/321 |

* cited by examiner

Primary Examiner—Johnny D. Cherry
(74) Attorney, Agent, or Firm—Gifford, Krass, Groh, Sprinkle, Anderson & Citkowski, PC

(57) ABSTRACT

A winch hook holding device includes a body having a proximal end connected to an elongated handle and a distal portion including a hook-shaped curved cradle for at least temporarily holding a winch hook. The cradle features a curved recess corresponding to the back surface of the hook and an opening corresponding to the opening of the hook, enabling the hook to be supported in the cradle and brought to the eyelet and released from the cradle once engaged. An alternative embodiment further includes a biasing element such as a spring-loaded lever disposed within a portion of the groove for applying pressure to the hook for active retainment therein. The connector at the proximal end of the handle preferably includes a threaded connector that mates with an elongated handle having a threaded end, thereby allowing handles available for other purposes to be utilized. Custom handles may also be provided according to the invention, including telescoping varieties. Preferably the hook-holding body is a unitary piece of molded plastic.

11 Claims, 5 Drawing Sheets

WINCH HOOK HOLDER

FIELD OF THE INVENTION

This invention relates generally to apparatus for holding and reaching and, more articularly, to apparatus for holding a winch hook of the type coupled to the bow of a oat when loading the boat onto a trailer.

BACKGROUND OF THE INVENTION

Small boats such as row boats and powered fishing boats, and the like, are conveniently hauled by cars and trucks using trailers suitable for highway use. Such boats are unloaded into the water; the driver generally backs the rig down a ramp until the boat becomes buoyant, then pulls the trailer out of the water, leaving the boat free for use.

To load the boat back onto the trailer, a hook coupled to a winch is fastened to the bow end of the boat with the trailer in the water, and the winch is cranked to pull the boat back onto the trailer. In contrast to the unloading, however, where the boat may first be unfastened then guided into the water to become buoyant, the loading operation typically requires a person to attach the winch hook to the bow end of the boat while the boat is floating in the water. Although the trailer is generally at least partially submerged at this time as well, the boat is typically far enough away from the trailer that the individual must either wade in the water or stand on the trailer and attempt to reach the boat by hand. In any event, the person either gets wet or must strain to grab the vessel, often requiring the help of others.

What is needed is an extension arm that can be used to at least temporarily hold the winch hook at a distance extended from the back of the trailer, thereby enabling the individual to reach the ring or cleat used to catch the winch hook. One invention exists for this purpose, but it has limitations. U.S. Pat. No. 5,215,344, entitled "Winch Cable Attachment Apparatus," disclosed an attachment for releasably gripping a hook at one end of a winch cable to facilitate coupling of the hook to a boat that is pulled from the water. However, the solution set forth in this patent has a body provided with a hook-accommodating slot in one side thereof and a groove in the opposite side thereof for accommodating an elongated support. Although the slot is tapered with side walls between which the hook may be wedged, thereby allowing for differently-sized winch hooks, the apparatus serves no purpose other than winch hook engagement, and should the resilient material used to capture the hook become worn or broken, operation of the device may become further limited.

SUMMARY OF THE INVENTION

The present invention resides in a winch hook holding device attached to an elongated handle. The device includes a body having a proximal end connected to the handle and a distal portion including a hook-shaped curved cradle for at least temporarily holding the winch hook. Thus, in contract to existing devices, the winch hook holding portion is itself hook-shaped, enabling the tool to be used for other snaring purposes when a winch hook is not retained therein.

In the preferred embodiment, the cradle features a curved recess corresponding to the back surface of the hook and an opening corresponding to the opening of the hook, enabling the hook to be supported in the cradle and brought to the eyelet and released from the cradle once engaged. An alternative embodiment further includes a biasing element such as a spring-loaded lever disposed within a portion of the groove for applying pressure to the hook for active retainment therein.

The connector at the proximal end of the handle preferably includes a threaded connector that mates with an elongated handle having a threaded end, thereby allowing handles available for other purposes to be utilized. Custom handles may also be provided according to the invention, including telescoping varieties. Preferably, the hook-holding body is a unitary piece of molded plastic.

DETAILED DESCRIPTION OF THE INVENTION

Figure 1:
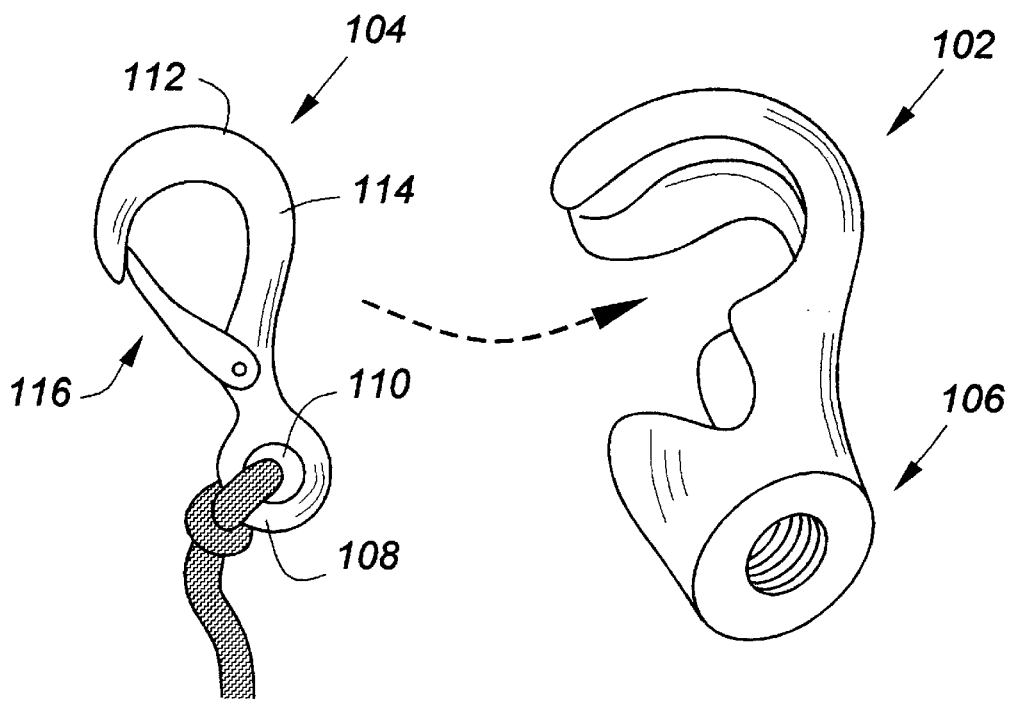
FIG. 1 is a perspective-view drawing of a preferred embodiment according to the invention.

FIG. 1 is a drawing seen from an oblique perspective illustrating a preferred embodiment of the invention. Broadly, the winch hook holder includes a distal portion 102 featuring a grooved cavity dimensioned to receive a winch hook 104 therein. At the proximal end 106 of the device, there is preferably included a threaded hole 108 allowing the holder to be coupled to a standard threaded pole of the type used to extend household implements such as paint rollers, cleaning tools, and so forth. Although a threaded connection is shown, it will be appreciated that an integral connection to an extension pole is also anticipated by the invention, and that telescoping poles may conveniently be used in some circumstances where smaller size is desirable for stowage. A preferred set of dimensions associated with the preferred embodiment are provided with respect to FIG. 3.

Figure 2:
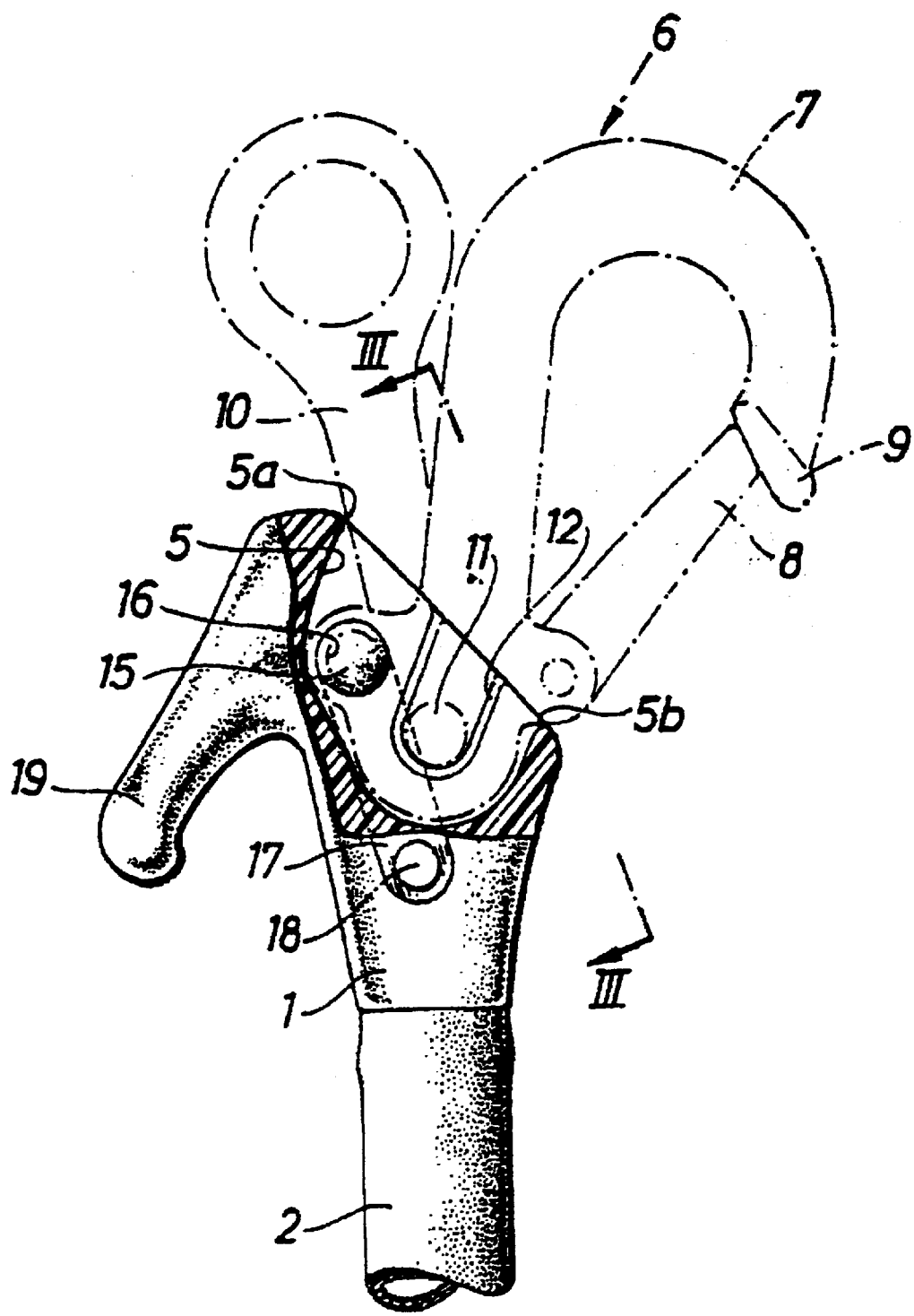
FIG. 2 is a perspective-view drawing of an alternative embodiment of the invention incorporating a spring-biased feature for active engagement, including engagement of differently sized winch hooks.

FIG. 2 illustrates an alternative embodiment of the invention similarly including a threaded proximal end 206, but wherein the distal portion 202 further inches a grooved appendage 204 biased by spring 208. The configuration of FIG. 2 is used where, for instance, smaller or unconventionally sized winch hooks may nevertheless need to be firmly secured.

Figure 4:
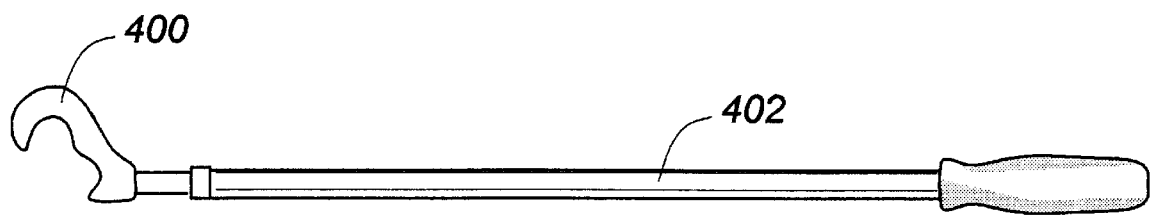
FIG. 4 is a side-view drawing of a hook holder according to the present invention with a telescoping handle.
Figure 3A:
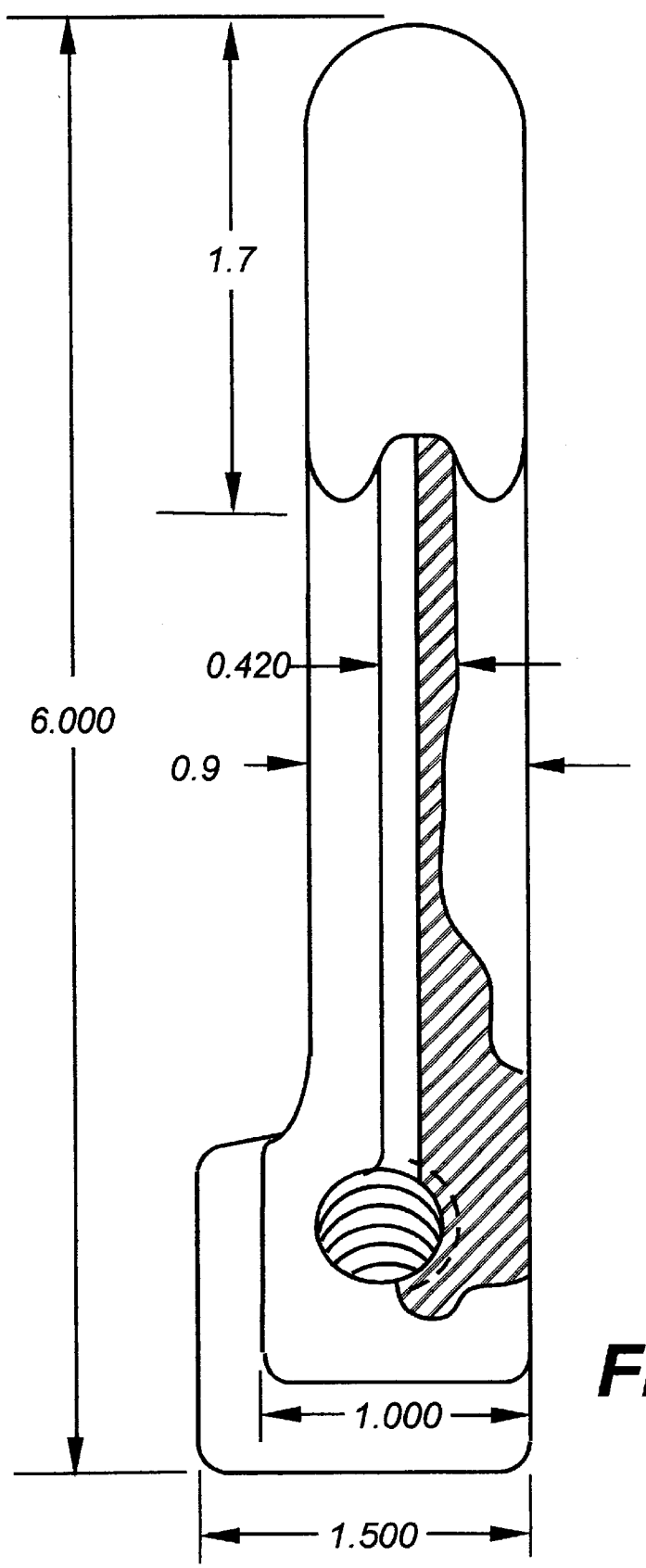
FIG. 3A is a front-view drawing of a hook holder according to the present invention showing preferred dimensions.
Figure 3B:
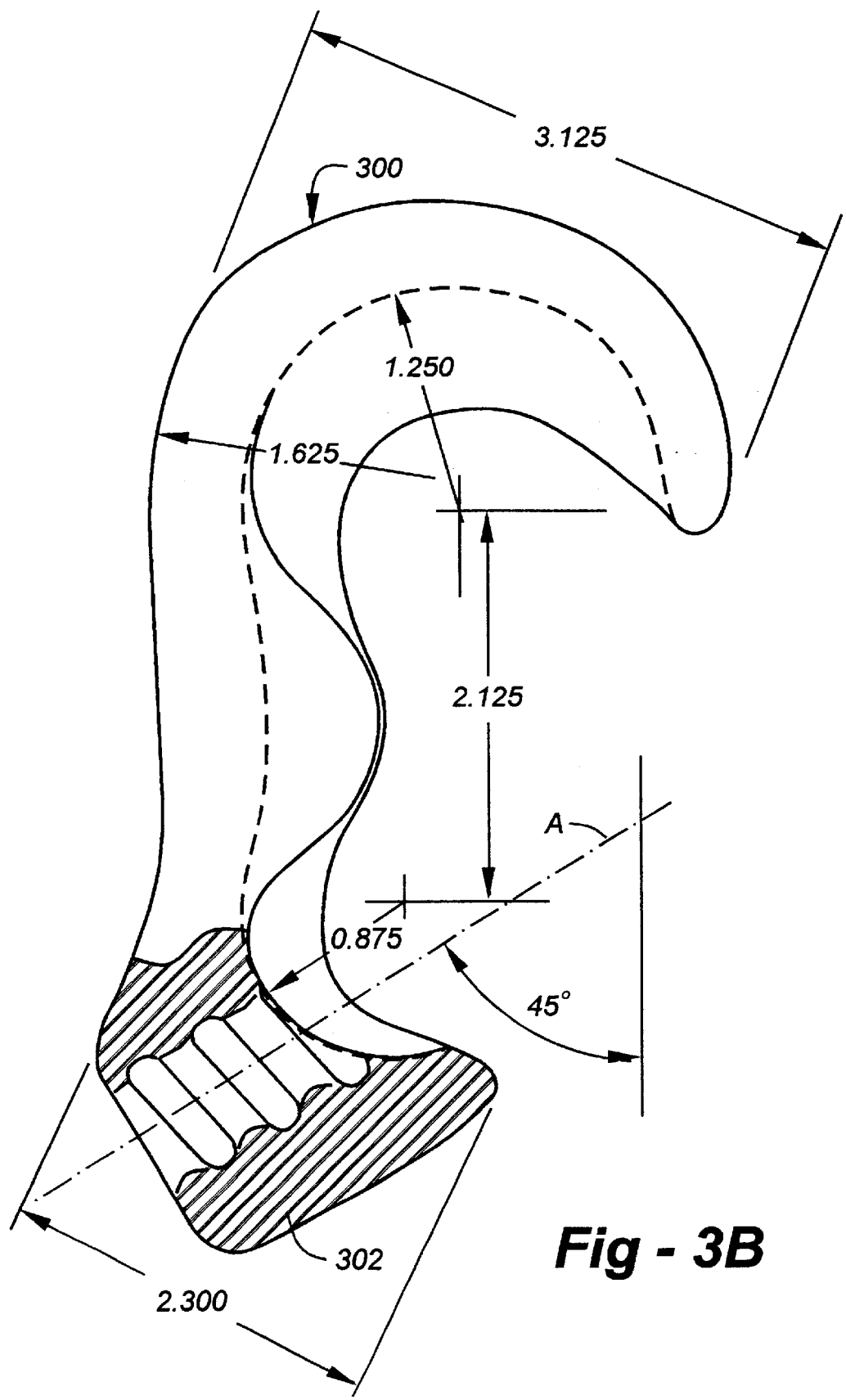
FIG. 3B is a side-view drawing, in partial cross-section, of the holder of FIG. 3A showing preferred dimensions.
Figure 3C:
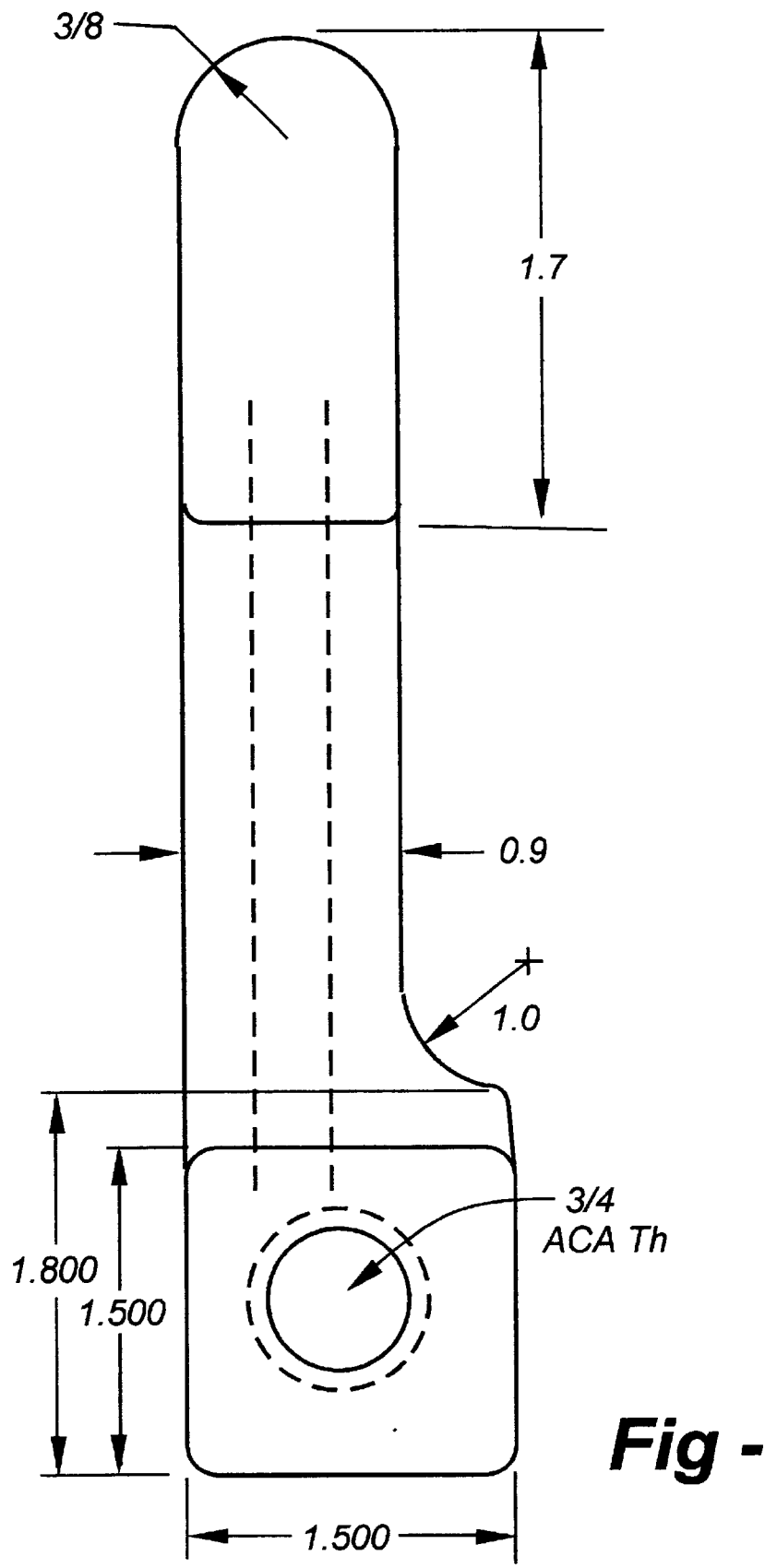
FIG. 3C is a back-view drawing of the holder of FIG. 3A showing preferred dimension.

FIGS. 3A–C are engineering-type drawings which show important dimensions associated with the preferred embodiment of the invention of FIG. 1. It will be appreciated that these parameters may be varied in accordance with the invention, so long as the hook capturing and holding principles disclosed herein are maintained. The overall length of the device is approximately 6 inches, and has a width of approximately 3.5 inches, or thereabouts. The device may be manufacturing from any suitable material, including metal and plastics, though a molded plastic is used in the preferred embodiment. Referring to FIG. 3B, it will be appreciated that the hook holder 300 has a proximal end 302 that connects to an elongated handle. FIG. 4 shows a hook holder 400 connected to a handle 402. Referring again to FIG. 3B, the elongated handle, once connected to the hook holder 300, may be said to have a central axis. This central axis is shown by line A. It will be appreciated by those of skill in the art that a winch hook, once properly positioned in the hook holder 300, is positioned at an angle to the central axis A. If a plane is defined which contains the central axis A, the hook shaped curved end of the winch hook will be located such that it is entirely on one side of the plane containing the central axis A, with the opening in the hook facing the plane.

Note that the threaded portion at the proximal end is preferably angled at 45 degrees, or thereabouts, relative to the length of the holding body portion, to allow for easier capture of the hook or cleat with the winch hook once retained.

I claim:

1. A device for attachment to an elongated handle and for holding a winch hook of the type having a curved back surface and an opposing opening to receive an eyelet, the device comprising:

a body having a proximal end and a distal portion with a hook receiving side and an opposing back side;

the proximal end including a connector for attaching the body to the elongated handle;

the distal portion including a hook-shaped curved cradle on the hook receiving side for at least temporarily holding the winch hook; and the cradle featuring a curved recess corresponding to the back surface of the hook and an opening corresponding to the opening of the hook;

whereby the hook may be supported in the cradle and brought to the eyelet and released from the cradle once engaged.

2. The device according to claim 1, further including a biasing element disposed within a portion of the recess for applying pressure to the hook for active retainment therein.

3. The device according to claim 2, wherein the biasing element is a spring-loaded lever.

4. The device according to claim 1, wherein:

the elongated handle includes a threaded end; and the connector at the proximal end of the device is a threaded connector that mates with the threaded end of the handle.

5. The device according to claim 1, wherein the body is a unitary piece of molded plastic.

6. A tool for holding a winch hook of the type having a curved back surface and an opposing opening to receive an eyelet, comprising:

an elongated handle; and a body having a proximal end attached to the handle and a distal portion with a hook receiving side and an opposing back side, the distal portion including a hook-shaped curved cradle on the hook receiving side for at least temporarily holding the winch hook;

the cradle featuring a curved recess corresponding to the back surface of the hook and an opening corresponding to the opening of the hook;

whereby the hook may be supported in the cradle and brought to the eyelet and released from the cradle once engaged.

7. The tool according to claim 6, further including a biasing element disposed within a portion of the recess for applying pressure to the hook for active retainment therein.

8. The tool according to claim 7, wherein the biasing element is a spring-loaded lever.

9. The tool according to claim 6, wherein:

the elongated handle includes a threaded end; and the proximal end of the device includes a threaded connector that mates with the threaded end of the handle.

10. The tool according to claim 6, wherein the body is a unitary piece of molded plastic.

11. The tool according to claim 6, wherein the elongated handle is a telescoping handle.

* * * * *